(12) United States Patent
Almodovar et al.

(10) Patent No.: US 11,359,417 B2
(45) Date of Patent: Jun. 14, 2022

(54) ELECTRONIC TRIGGER ROTARY PAWL LATCH

(71) Applicant: Allegis Corporation, Minneapolis, MN (US)

(72) Inventors: Jeffery Almodovar, Ramsey, MN (US); Tye S. Sonney, Lakeville, MN (US); Larry Witiak, Lexington, SC (US)

(73) Assignee: Allegis Corporation, Minneapolis, MN (US)

( * ) Notice: Subject to any disclaimer, the term of this patent is extended or adjusted under 35 U.S.C. 154(b) by 440 days.

(21) Appl. No.: 16/666,665

(22) Filed: Oct. 29, 2019

(65) Prior Publication Data
US 2020/0131809 A1 Apr. 30, 2020

Related U.S. Application Data

(60) Provisional application No. 62/751,922, filed on Oct. 29, 2018.

(51) Int. Cl.
*E05B 81/14* (2014.01)
*B60P 7/13* (2006.01)
*E05B 81/62* (2014.01)
*E05B 81/66* (2014.01)

(52) U.S. Cl.
CPC ............. *E05B 81/14* (2013.01); *B60P 7/13* (2013.01); *E05B 81/62* (2013.01); *E05B 81/66* (2013.01)

(58) Field of Classification Search
CPC ...... E05B 17/0029; E05B 17/10; E05B 17/22; E05B 41/00; E05B 81/00; E05B 81/04; E05B 81/14; E05B 81/62; E05B 81/64; E05B 81/66; E05B 81/68; B60P 7/13
USPC ......................... 292/201, 194, 216, DIG. 53
See application file for complete search history.

(56) References Cited

U.S. PATENT DOCUMENTS

| | | | |
|---|---|---|---|
| 6,513,353 B1 * | 2/2003 | Weinerman | E05C 9/047 292/DIG. 31 |
| 8,186,730 B2 * | 5/2012 | Berghahn | E05B 81/14 292/216 |
| 8,496,275 B2 | 7/2013 | Garneau et al. | |
| 8,516,864 B2 * | 8/2013 | Greiner | E05B 47/0607 292/201 |
| 8,646,816 B2 * | 2/2014 | Dziurdzia | E05B 17/0029 292/216 |

(Continued)

*Primary Examiner* — Kristina R Fulton
*Assistant Examiner* — James Edward Ignaczewski
(74) *Attorney, Agent, or Firm* — Edwin E. Voigt, II

(57) ABSTRACT

An electronic trigger rotary latch includes a trigger cutout, a controller in electrical communication with a plug receiver. Springs are engaged to the latch and trigger pawls. A gear motor having an actuator engages a surface of the trigger pawl. A handle includes a striker bolt and an electrical plug. In an unlatched configuration the striker bolt is separated from the latch pawl, an electrical circuit is open, the latch pawl spring has reduced compression, the trigger pawl spring has increased compression, and the trigger tip is engaged to a latch tab. The actuator has moved the lower leg in the trigger cutout. In the latched configuration, the striker bolt is held by the latch pawl, an electrical circuit is closed, the trigger tip is engaged to the latch shoulder, and the trigger leg has been moved in the trigger cutout in an opposite direction.

18 Claims, 7 Drawing Sheets

(56) References Cited

U.S. PATENT DOCUMENTS

| | | | | |
|---|---|---|---|---|
| 8,672,368 | B2* | 3/2014 | Grosdemouge | E05B 85/02 292/216 |
| 10,914,098 | B2* | 2/2021 | Zhang | E05C 3/24 |
| 2008/0252083 | A1* | 10/2008 | Carabalona | E05B 81/20 292/49 |
| 2009/0235767 | A1* | 9/2009 | Garneau | E05B 65/46 292/201 |
| 2015/0145265 | A1* | 5/2015 | Weinerman | E05B 81/06 292/199 |
| 2016/0130840 | A1* | 5/2016 | Garneau | E05B 47/0607 292/201 |

* cited by examiner

ELECTRONIC TRIGGER ROTARY PAWL LATCH

CROSS-REFERENCE TO RELATED APPLICATIONS

This application claims the benefit of U.S. Provisional Patent Application Ser. No. 62/751,922 filed Oct. 29, 2018, which is incorporated by reference herein in its entirety.

FIELD OF THE INVENTION

The invention generally relates to latches and the locking of cabinets as used on trucks or other motor vehicles. The invention is electronic eliminating the need for a physical key.

BACKGROUND

Trucks as known include various compartments for transportation of tools, equipment and other useful items. The compartments transporting items in the past have generally been locked with a physical key or have remained unlocked.

It is undesirable to leave compartments containing tools unlocked due to security concerns and the risk of inadvertent opening of a compartment during transit. In addition, it is occasionally difficult to determine if a compartment is fully latched to avoid inadvertent opening.

The use of physical keys in the past has been inconvenient, in that keys are misplaced, difficult to identify, and time consuming to separate from other keys when needed. In addition, in adverse weather conditions the locks opened through the use of a physical key frequently are exposed to moisture and may freeze making use of a key to access a compartment difficult.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

In at least one embodiment, an electronic trigger rotary pawl latch includes a housing having a plug receiver cutout, a left wall having a striker bolt receiving area, a bottom wall having a trigger pawl cutout, a right wall having an electrical adapter cutout, a top wall, a front wall, a back wall, and an interior.

In another embodiment, the housing further includes a first angled tab extending from the front wall into the interior, a second angled tab extending from the front wall into the interior, the second angled tab being positioned between the left wall and the first angled tab.

In a further embodiment, a rotary pawl pivot extends from the front wall into the interior, the rotary pawl pivot being positioned below the first angled tab.

In an additional embodiment, a first pin extends from the front wall into the interior, the first pin being positioned centrally relative to the front wall.

In at least one additional embodiment, a trigger pawl pivot extends from the front wall into the interior, the trigger pawl pivot being located proximate to the first pin below the rotary pawl pivot.

In at least one further embodiment, a second pin extends from the front wall into the interior, the second pin being positioned proximate to the trigger pawl pivot.

In a further embodiment, a third angled tab extends from the front wall into the interior, the third angled tab being located below the first pin.

In an additional embodiment, a plug receiver is positioned in the plug receiver cutout, the plug receiver having at least one open electrical contact.

In at least one embodiment, a controller is positioned in the interior, the controller being in electrical communication with the plug receiver, a gear motor and an electrical connector, where the controller is in communication with a keypad to release the electronic trigger rotary pawl latch from a latched configuration.

In another embodiment, a latch pawl spring is engaged to the rotary pawl pivot, the latch pawl spring also being engaged to the second angled tab or the first angled tab.

In at least one embodiment, a trigger pawl spring is engaged to the trigger pawl pivot, the trigger pawl spring also being engaged to the third angled tab.

In another embodiment, a latch pawl includes a first pivot opening where the first pivot opening is disposed around the rotary pawl pivot, the latch pawl further having a latch pawl tab extending horizontally outwardly from the latch pawl proximate to the first pivot opening, the latch pawl tab having a latch pawl ledge and a latch pawl shoulder, the latch pawl shoulder being disposed between a latch pawl lower surface and the latch pawl ledge, the latch pawl having a latch pawl upper surface, a cavity opposite to the first pivot opening, the cavity having a pair of prongs, and the latch pawl lower surface engages the latch pawl spring.

In at least one embodiment, a trigger pawl includes a trigger pawl tip, a trigger pawl upper surface, a trigger pawl lower surface, a second pivot opening, the second pivot opening being disposed around the trigger pawl pivot, the trigger pawl further having an upper leg surface and a lower leg surface and a trigger pawl leg below the second pivot opening, where a portion of the trigger pawl leg extends through the trigger pawl cutout to the exterior of the housing, and the upper leg surface engages the trigger pawl spring.

In another embodiment, the gear motor is disposed within the interior proximate to the bottom wall, the gear motor having an actuator where the actuator engages the lower leg surface, the gear motor being initiated by the controller after a passcode has been entered into a keypad.

In some embodiments an electrical connector is disposed in the electrical adapter cutout, the electrical connector receiving power from a power source, and the electrical connector being in electrical communication with the controller.

In at least one embodiment, a handle body includes a front side having a handle and a cavern, the handle body further having a rear side having a striker bolt and an electrical plug, where the electrical plug has at least one contact.

In some embodiments, the housing and the handle body have an unlatched configuration where the striker bolt is separated from the cavity and the at least one contact is separated from the at least one open electrical contact, the latch pawl upper surface is proximate to the second angled tab and the latch pawl spring has a reduced latch pawl spring compression as compared to the latch pawl spring compression in a latched configuration, the trigger pawl tip is engaged to the latch pawl ledge, the trigger pawl spring is exposed to an increased trigger pawl spring compression in the unlatched configuration as compared to the trigger pawl spring compression in the latched configuration, the actuator is engaged to the lower leg surface and the trigger pawl leg has been moved in the trigger pawl cutout towards the left wall.

In another embodiment, in the latched configuration the striker bolt is positioned within the cavity between the prongs, the at least one contact is engaged to the at least one open electrical contact completing an electrical circuit, the latch pawl spring is exposed to increased latch pawl spring compression as compared to the latch pawl spring compression in the unlatched configuration, the trigger pawl tip is engaged to the latch pawl shoulder, the trigger pawl spring is exposed to decreased trigger pawl spring compression as compared to the trigger pawl spring compression in the unlatched configuration, and the actuator is disengaged from the lower leg surface and the trigger pawl leg has moved in said trigger pawl cutout towards the right wall.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

DETAILED DESCRIPTION OF THE PREFERRED EMBODIMENTS

Figure 1:
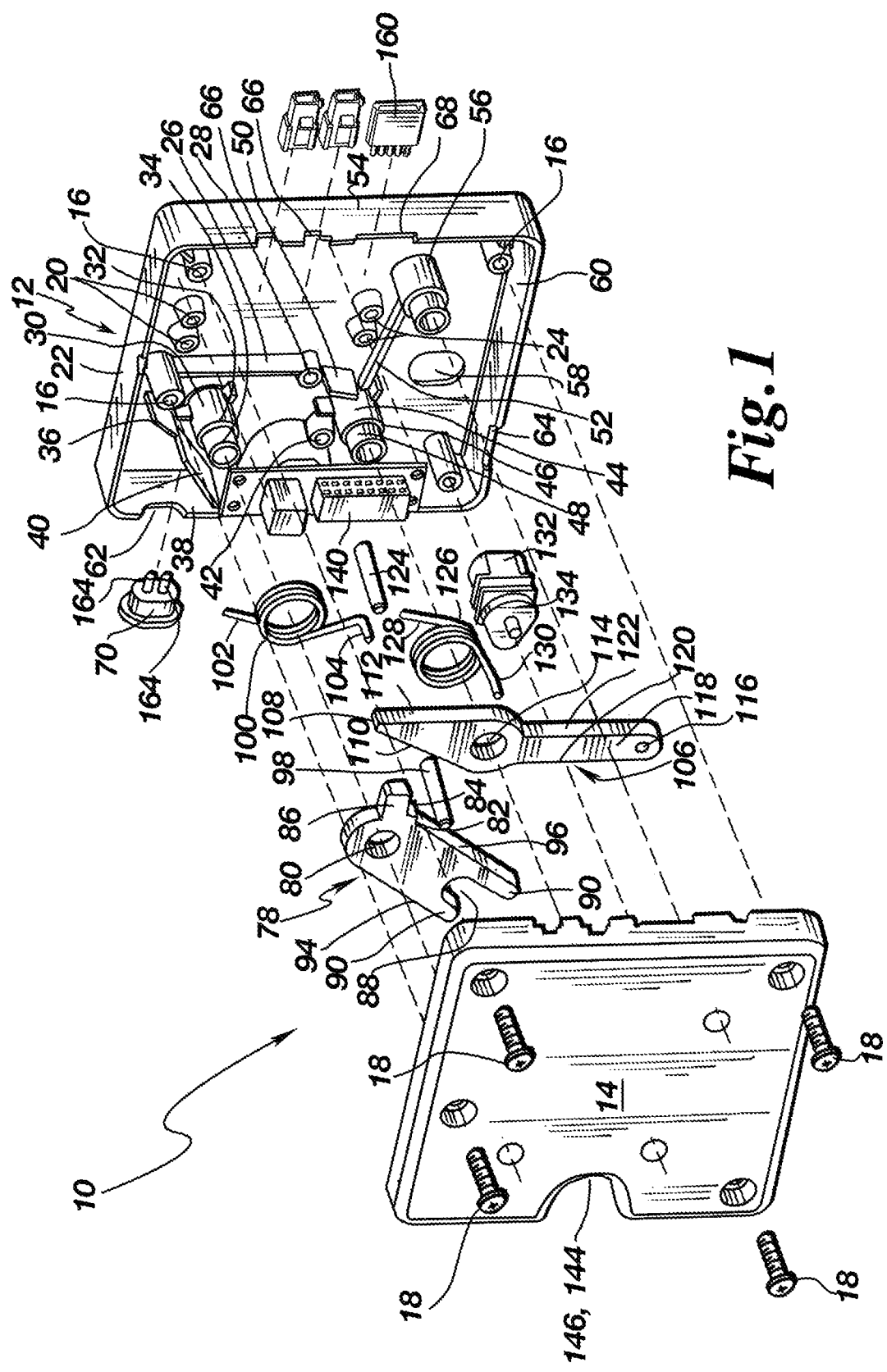
FIG. 1 is an isometric exploded view of the electronic trigger rotary pawl latch.
Figure 2:
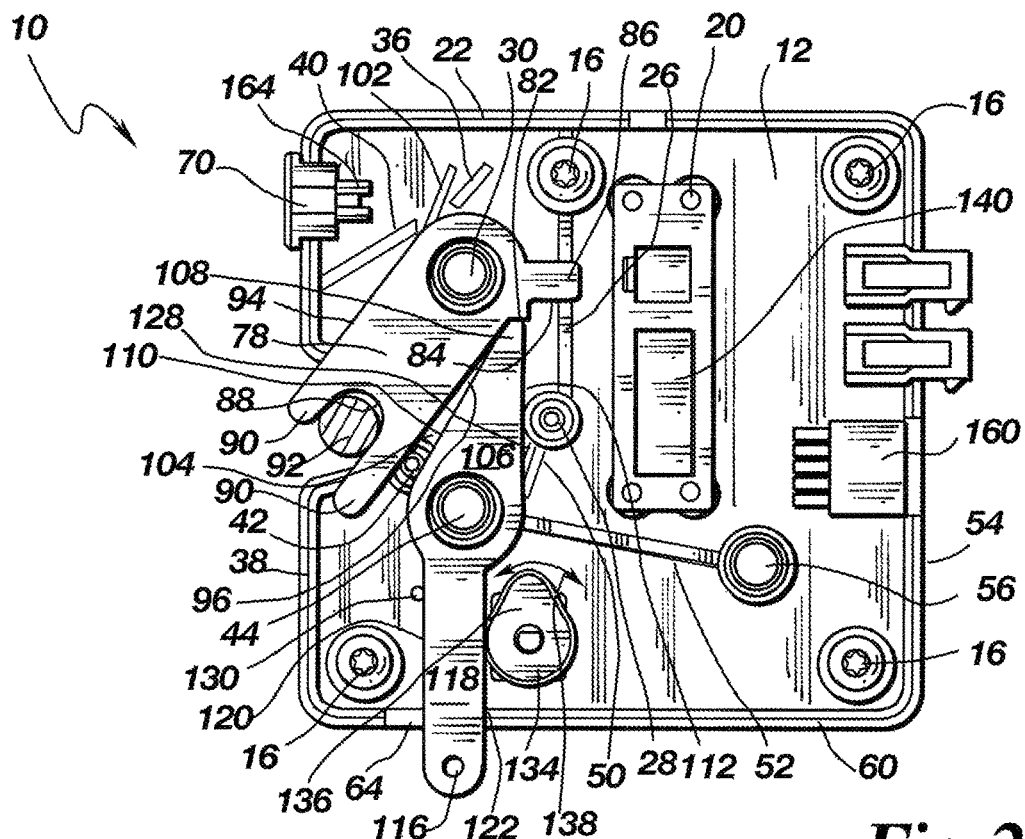
FIG. 2 is a front side elevation view of the interior of the electronic trigger rotary pawl latch.
Figure 3:
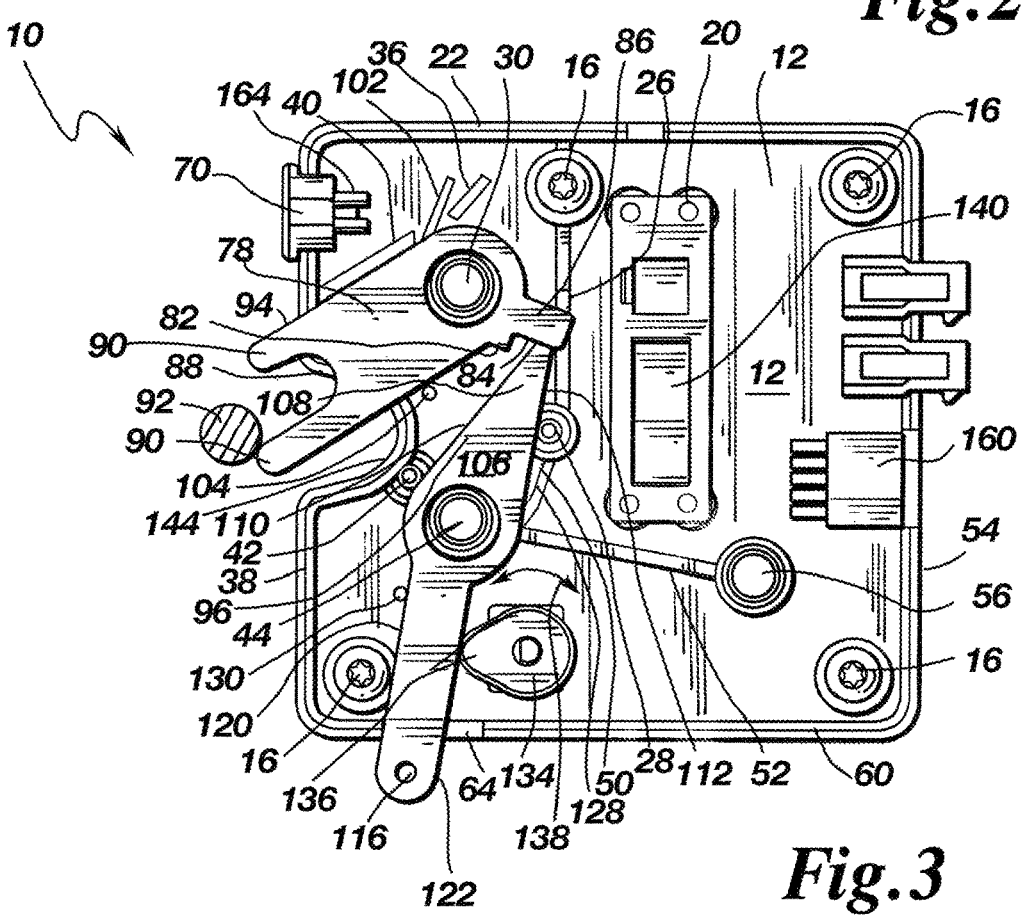
FIG. 3 is an alternative front side elevation view of the interior of the electronic trigger rotary pawl latch.

In general the electronic trigger rotary pawl latch will be identified by reference numeral 10. For brevity the electronic trigger rotary pawl latch will hereinafter be referred to as the rotary pawl latch 10.

In a first embodiment the rotary pawl latch 10 includes a first housing 12 releasably secured to a second housing 14. The interior of the first housing 12 includes a number of fastener receivers 16 which receive fasteners 18 to releasably secure the first housing 12 to the second housing 14.

In at least one embodiment, the first housing 12 and second housing 14 are substantially square in shape. In alternative embodiments, the first housing 12 and second housing 14 may be rectangular, or any other shape to accommodate a desired latching application.

The first housing 12 and second housing 14 are preferably formed of plastic material which may be molded. However any other plastic, metal or composite material may be used for the first housing 12 and the second housing 14. In addition, the interior of the second housing 14 may be identical to, or may be a mirror or reverse image of the interior of the first housing 12. Alternatively, the second housing 14 may be a cover having minimal structure for engagement to the first housing 12. The elements described for the first housing 12 are equally applicable to the second housing 14.

In some embodiments, the interior of the first housing 12 includes a pair of upper printed circuit board fastener receivers 20 which are located centrally below a top wall 22. A pair of lower printed circuit board receivers 24 are preferably centrally located within the interior of the first housing 12. It should be noted that only a single printed circuit board controller/microprocessor 140 is used with each rotary pawl latch 10.

In at least one embodiment, a first structure 26 extends downwardly from a fastener receiver 16 which is proximate to the center of the top wall 22. The first structure 26 terminates at a first pin receiver 28. The first structure 26 is preferably of reduced elevation or height relative to the top wall 22, and extends downwardly in a direction normal thereto. The first structure 26 in one embodiment is similar to a structural wall having a reduced height dimension.

In at least one embodiment, a rotary pawl pivot 30 extends from the first housing 12 inwardly towards the second housing 14. The rotary pawl pivot 30 preferably includes a first positioning shoulder 32 and a first pivot bearing section 34 above the first positioning shoulder 32.

In some embodiments, a first angled tab 36 extends inwardly from the interior of the first housing 12. The first angled tab 36 is preferably located between a left wall 38 and an upper left fastener receiver 16 and is located below the top wall 22. The first angled tab 36 in at least one embodiment has a greater incline or angular orientation as compared to a second angled tab 40. A gap is located between the upper edge of the second angled tab 40 and the lower edge of the first angled tab 36.

In at least one embodiment, the second angled tab 40 extends inwardly from the interior of the first housing 12. The second angled tab 40 is preferably located below the first angled tab 36, and to the left of the first angled tab 36 towards the left wall 38. The second angled tab 40 is positioned between the left wall 38 and the first angled tab 36.

In at least one embodiment, a space exists between the upper left fastener receiver 16 and a lower side of the first angled tab 36. In addition, another space is present between the rotary pawl pivot 30 and the lower side of the second angled tab 40.

In some embodiments a second pin receiver 42 is separated a distance, and is located below, the rotary pawl pivot 30, and is offset relative to the center of the interior of the first housing 12 towards the left wall 38. The second pin receiver 42 is also disposed below the first pin receiver 28.

A trigger pawl pivot 44 is preferably aligned with, and positioned below, the rotary pawl pivot 30. The trigger pawl pivot 44 is also preferably disposed below and to the right of the second pin receiver 42. The trigger pawl pivot 44 preferably includes a second positioning shoulder 46 and trigger pawl bearing section 48 above the second positioning shoulder 46.

In at least one embodiment, a third angled tab 50 extends inwardly from the first housing 12. The first angled tab 50 is positioned to the right of the trigger pawl pivot 44 establishing an additional gap therebetween. In addition, the third angled tab 50 is preferably disposed at least partially above the trigger pawl pivot 44.

A second structure 52 preferably extends angularly downwardly from the trigger pawl pivot 44 towards the right wall 54. In at least one embodiment, the second structure 52 has approximately the same height dimension as the first structure 26. The second structure 52 terminates at a third pivot 56. The third pivot 56 extends inwardly from the interior of the first housing 12 proximate to the right wall 54.

In at least one embodiment, the first housing 12 includes a gear motor depression 58. The gear motor depression 58 is preferably centrally positioned relative to the left wall 38 and right wall 54, proximate to and above the bottom wall 60.

In at least one embodiment, the left wall 38 proximate to the top wall 22 includes a plug receiver cutout 62. In addition, the bottom wall 60 proximate to the left wall 38 includes a trigger pawl cutout 64.

In at least one additional embodiment, the right wall 54 proximate to the top wall 22 includes a pair of output plug cutouts 66 and an electrical adapter cutout 68 below the pair of output plug cutouts 66.

In a preferred embodiment, the left wall 38 includes an arcuate concave striker bolt receiving area 144. The striker bolt receiving area 144 is centrally located in the left wall 38 and positioned and equal distance between the top wall 22 and the bottom wall 60. The striker bolt receiving area 144 is preferably sized for receipt of the pair of prongs 90, and the cavity 88 of the latch pawl 78, as well as the striker bolt 92 in the latched or locked configuration.

In the unlatched or unlocked configuration, the bottom prong of the pair of prongs 90 preferably angularly bisects the striker bolt receiving area 144. In the unlatched or unlocked configuration the striker bolt 92 is outwardly removed from the pair of prongs 90, the cavity 88, as well as the striker bolt receiving area 144.

In at least one embodiment, the striker bolt receiving area 144 extends inwardly towards the center of the first housing 12 and second housing 14 a distance at least equal to the location of the second pin receiver 42. The second pin receiver 42 is preferably located below the bottom right side of the striker bolt receiving area 144 at a location of approximately 4 o'clock, assuming the striker bolt receiving area 144 included the face of an analog clock.

In the preferred embodiment, the left wall 38 is continuous between the top wall 22 and the bottom wall 60 through the striker bolt receiving area 144.

In a preferred embodiment, the engagement of the second housing 14 to the first housing 12 creates a latch pawl slot 146 within the striker bolt receiving area 144, permitting the positioning of the pair of prongs 92 to the exterior of the rotary pawl latch 10 and left wall 38.

In at least one embodiment, as may be seen in FIGS. 2 through 7, the upper and lower prongs of the pair of prongs 90 are disposed within the latch pawl slot 146 when the latch pawl upper surface 94 is engaged to the lower surface of the second angled tab 40. In addition, the upper and lower prongs of the pair of prongs 90 are disposed within the latch pawl slot 146 when the latch pawl lower surface 96 is proximate to the second pin receiver 42.

In at least one embodiment, the latch pawl slot 146 covers the entirety of the striker bolt receiving area 144, between the first housing 12 and the second housing 14.

In at least one embodiment, a plug receiver 70 is disposed between, and is secured within, the plug receiver cutout 62 of the first housing 12 and second housing 14.

The plug receiver 70 is also in electrical communication with a handle 72 and the handle body 74. An electrical circuit is closed and activated by the closing of the first housing 12 and second housing 14 relative to the handle body 74.

In at least one embodiment, the plug receiver 70 establishes an electrical activation switch for a latch circuit which provides power to lights which in turn provide a visual indication as to whether the system status is latched or unlatched.

In at least one embodiment, a latch pawl 78 includes a first pivot opening 80 proximate to a top. Adjacent to the first pivot opening 80 may be located a latch pawl shoulder 82 and a latch pawl ledge 84. The latch pawl ledge 84 may be the lower horizontal surface of a latch pawl tab 86. The latch pawl tab 86 extends outwardly from the upper portion of the latch pawl 78 as shown in FIGS. 2 through 7. In the locked configuration the latch pawl tab 86 is aligned horizontally and is substantially parallel to the top wall 22 and bottom wall 60 of the first housing 12 and second housing 14.

In at least one embodiment, an arcuate concave cavity 88 is located at the end of the latch pawl 78 opposite to the upper end. The cavity 88 includes a pair of prongs 90 which in the locked position are disposed on opposite sides of the striker bolt 92, securing the striker bolt 92 in a latched position relative to the first housing 12, second housing 14, handle 72 and handle body 74.

The latch pawl 78 includes a latch pawl upper surface 94 and a latch pawl lower surface 96. In the unlatched position latch pawl upper surface 94 is adjacent to, and is in contact with, the underside of the second angled tab 40, which functions as a rotational stop, limiting the upper movement of the latch pawl 78 relative to the first housing 12 and second housing 14.

In a latched position, the latch pawl lower surface 96 is adjacent to, and is in contact with, a second pin 98 as disposed within the second pin receiver 42 of the first housing 12 and second housing 14. The second pin 98 preferably functions as a rotational stop for the latch pawl lower surface 96 during the positioning, latching and engagement of the striker bolt 92 within the cavity 88, limiting further inward rotation of the latch pawl 78 relative to the first housing 12 and second housing 14.

In a preferred embodiment, the first pivot opening 80 is disposed in surrounding engagement of the pivot bearing section 34 of the rotary pawl pivot 30. The first position shoulder 32 functions to limit the insertion of the latch pawl 78 downwardly upon the rotary pawl pivot 30. In the preferred embodiment, the first pivot opening 80 is freely rotatable relative to the pivot bearing section 34 during the movement of the latch pawl 78 between the latched and unlatched positions relative to the striker bolt 92.

In at least one embodiment a latch pawl spring 100 is disposed around the rotary pawl pivot 30. The latch pawl spring 100 includes a first tab 102 and a second tab 104. The first tab 102 is preferably enlarged and is positioned for extension through and beyond the gap between the upper edge of the second angled tab 40 and the lower edge of the first angled tab 36. The central body of the spring 100 is disposed around the rotary pawl pivot 30, and the second tab 104 is positioned for contact with the latch pawl lower surface 96. The engagement of the first tab 102 to the first angled tab 36, and the engagement of the second tab 104 to the latch pawl lower surface 96 places an initial amount of tension on spring 100 and positions the latch pawl 78 in the upper disengaged, unlatched position when the tension on spring 100 is at its minimum level. Conversely, the tension on the spring 100 is maximized when the latch pawl 78 is rotated downwardly for locking of a striker bolt 92 within the cavity 88 in the latched position. Upon release of the locked or latched position, the spring 100 will decompress and pivot the latch pawl 78 upwardly to the at rest, unlocked or unlatched position relative to the first housing 12 and second housing 14.

In one embodiment, the rotary pawl latch 10 includes a trigger pawl 106. The trigger pawl 106 includes a trigger pawl tip 108. The trigger pawl 106 also includes a trigger pawl upper surface 110 and a trigger pawl lower surface 112. A second pivot opening 114 is preferably centrally located between the trigger pawl tip 108 and the trigger pawl lower opening 116. The trigger pawl lower opening 116 passes through the lower portion of the trigger pawl leg 118. The trigger pawl leg 118 also includes an upper leg surface 120 and a lower leg surface 122.

During assembly the second pivot opening 114 is placed over the trigger pawl bearing section 48 of the trigger pawl pivot 44. The second pivot opening 114 is preferably freely rotatable around the trigger pawl bearing section 48 and the trigger pawl 106 preferably is positioned adjacent to the second positioning shoulder 46.

In at least one embodiment, in the latched configuration, the trigger pawl tip 108 is engaged to the latch pawl shoulder 82. The trigger pawl tip 108 when in contact with the latch pawl shoulder 82 prevents the latch pawl 78 from rotation in an upwardly direction, and prevents the movement of the latch pawl lower surface 96 upwardly away from the second pin 98.

In the latched position the trigger pawl upper surface 110 is proximate to the latch pawl lower surface 96. In addition, the trigger pawl upper surface 110 is proximate to or is in contact with the second pin 98 as positioned in the second pin receiver 42. In this configuration the trigger pawl leg 118 extends in a substantially vertical direction downwardly through the trigger pawl cutout 64 of the first housing 12 and second housing 14.

In the latched position, the trigger pawl spring 126 is disposed over and is engaged to the trigger pawl pivot 44. The trigger pawl spring 126 includes a third tab 128 and a fourth tab 130.

The third tab 128 is preferably in contact with the upper surface of the third angled tab 50 and the fourth tab 130 is in releasable contact with the upper leg surface 120 and lower leg surface 122. In the locked or latched configuration, the trigger pawl spring 126 is slightly coiled having the minimum amount of tension placed on the lower leg surface 122.

In at least one embodiment, movement of the trigger pawl leg 118 laterally towards the left wall 38 increases the tension on the trigger pawl spring 126. The tension on the trigger pawl spring 126 is maximized when the trigger pawl 106 is in the unlatched or unlocked position, where the trigger pawl tip 108 has been moved towards the right wall 54 and is engaged to the latch pawl ledge 84.

In the released, unlocked or unlatched position, the trigger pawl tip 108 has been rotated toward the right wall 54, releasing the trigger pawl tip 108 from the latch pawl shoulder 82. The trigger pawl 106 rotates about trigger pawl pivot 44 when moving from the locked or latched configuration to the unlocked or unlatched configuration or position.

In the unlocked or unlatched configuration the trigger pawl lower surface 112 is moved inwardly within the first housing 12 and second housing 14 for contact with the first pin 124, which functions as a rotation limiting stop.

In addition, in the unlocked or unlatched configuration, the upper leg surface 120 may be in contact with the lower left fastener receiver 16 of the first housing 12 and second housing 14. It should also be noted that in the unlatched or unlocked configuration the upper leg surface 120, proximate to the bottom, is engaged to the forward edge of the trigger pawl cutout 64.

In at least one embodiment, the movement of the latch pawl 78 from the unlatched to the latched configuration or position moves the latch pawl tab 86 vertically relative to the first structure 26, which has a reduced height dimension. In addition, movement of the trigger pawl 106 from the unlatched to the latched configuration or position moves the area proximate to the second pivot opening 114 horizontally above the reduced height dimension of the second structure 52.

In at least one embodiment, an electric gear motor 132 is disposed in the gear motor depression 58 of the first housing 12 and second housing 14.

In one embodiment, the gear motor 132 includes an eccentric cam 134 which is mounted on an axle. The eccentric cam 134 is disposed in the same plane, and is adjacent to, the lower leg surface 122 of the trigger pawl 106. In at least one embodiment, the upper portion 136 of the eccentric cam 134 is positioned upwardly relative to the lower leg surface 122. In this configuration the electric gear motor 132 is at rest, and has not been actuated to rotate the axle to transfer lateral rotation to the eccentric cam 134. In this configuration the trigger pawl tip 108 is engaged to the latch pawl shoulder 82. Latching the trigger pawl 106 and the latch pawl 78 together which securely engages the striker bolt 92.

In one embodiment, the actuation of a switch (which may be a keypad) provides electricity to the gear motor 132, rotating the upper portion 136 in the direction of arrow 138 from a vertical position to a horizontal position towards the lower leg surface 122. Eccentric cam 134 during rotation towards the lower leg surface 122 loads the trigger pawl spring 126. The movement of the lower leg surface 122 laterally towards the left wall 38 within the trigger pawl cutout 64 moves the trigger pawl tip 108 laterally towards the right wall 54, and disengages the trigger pawl tip 108 from the latch pawl shoulder 82. The disengagement of the trigger pawl tip 108 from the latch pawl shoulder 82 releases the tension on the previously loaded latch pawl spring 100. The trigger pawl tip 108 continues to laterally move towards the right wall 54 along the latch pawl ledge 84 until the trigger pawl lower surface 112 contacts first pin 124 which functions as a rotational limiter or stop.

Simultaneously with the rotation of the trigger pawl tip 108 laterally towards the right wall 54, the latch pawl spring 100 exerts an uncoiling/release force through the second tab 104 to the latch pawl lower surface 96. The latch pawl lower surface 96 in turn rotates upwardly from the second pin 98 until such time as the latch pawl upper surface 94 engages the lower surface of the second angled tab 40 which functions as a rotational limiter or stop. When the latch pawl upper surface 94 engages the underside of the second angled tab 40, prongs 90 are elevated from the latching or locked configuration, to the unlatched, unlocked configuration where the striker bolt 92 may be removed from positioning between the prongs 90.

In at least one embodiment, the circuit board/controller 140 is secured to the upper circuit board fastener receivers 20 and lower circuit board fasteners 24 by fasteners. Once the circuit board/controller 140 has rotated the upper portion 136 of the eccentric cam 134 into a fully rotated position against the lower leg surface 122, the circuit board controller 140 may reverse rotation of the gear motor 132 to return the upper portion 136 to the initial vertical at rest position as indicated by arrow 138.

In at least one embodiment, the engagement of the striker bolt 92 of the handle body 74 within the cavity 88, between prongs 90, and continued insertion of the striker bolt 92 within the cavity 88, will load the latch pawl spring 100, and force cavity 88 and the latch pawl lower surface 96 towards the second pin 98. Simultaneously, the previously loaded trigger pawl spring 126 will release tension, and rotate the trigger pawl tip 108 laterally towards the left wall 38 along the latch pawl ledge 84. The continued insertion of the striker bolt 92 in the cavity 88 causes the latch pawl 78 to over rotate, elevating the latch pawl tab 86 a sufficient distance where the trigger pawl tip 108 will laterally move towards the left wall 98, as a result of the decompression of the trigger pawl spring 126, for positioning of the trigger pawl tip 108 beneath the latch pawl shoulder 82. The rotary pawl latch 10 is then placed into the latched configuration.

In the preferred embodiment, the engagement of the trigger pawl tip 108 to the latch pawl shoulder 82 prevents the release and rotation of the latch pawl 78 from a latched, locked configuration until such time as a circuit is closed and the gear motor 132 is engaged to rotate the eccentric cam 134 against the lower leg surface 122.

In at least one embodiment, the lower portion of the trigger pawl leg 118 and the trigger pawl lower opening 116 extend outwardly to the exterior of the first housing 12 and second housing 14. The extension of the lower portion of the trigger pawl leg 118 downwardly to the exterior of the first housing 12 and second housing 14 enables the rotary pawl latch 10 to be manipulated manually in the event of a power outage. The rotary pawl latch 10 may receive power from a main or supplemental battery power source for a vehicle. The manual manipulation of the lower portion of the trigger pawl leg 118 may be required when the gear motor 132 is receiving insufficient power to rotate the trigger pawl 106 towards or away from the left wall 38.

In at least one embodiment as described above, and as shown in FIGS. 2 and 3, the eccentric can 134 is aligned with and is in the same plane as the trigger pawl leg 118.

In this embodiment, the axle of the gear motor 132 extends in a direction, front to back, which is normal relative to the first housing 12 and second housing 14. In this embodiment, the distance between the upper portion 136 and lower portion of the eccentric cam 134 provides the linear displacement of the trigger pawl leg 118 within the trigger pawl cutout 64. In this embodiment, when the axle of the gear motor 132 is rotated, the edge of the eccentric cam 134 pushes against the lower leg surface 122 causing the trigger pawl 106 to rotate in a clockwise direction. During this rotation, the trigger pawl tip 108 is disengaged from the latch pawl shoulder 82, allowing the latch pawl 78 to rotate to the opened or unlatched/unlocked configuration.

Figure 4:
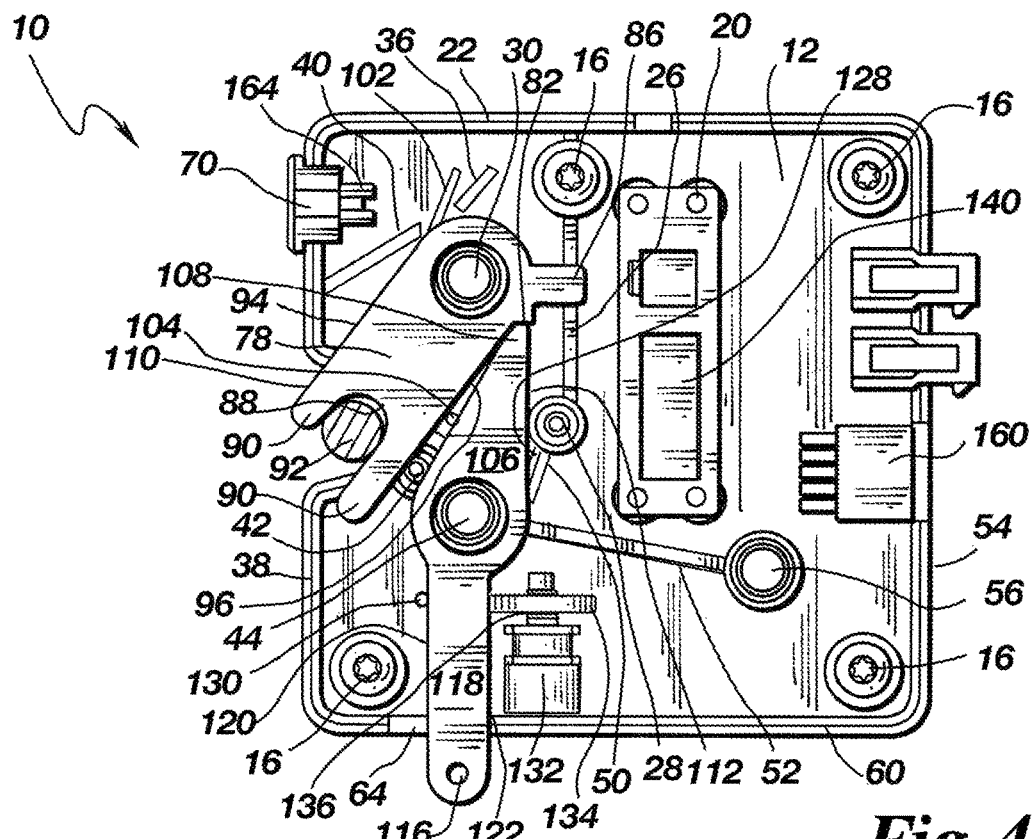
FIG. 4 is an alternative front side elevation view of the interior of the electronic trigger rotary pawl latch.
Figure 5:
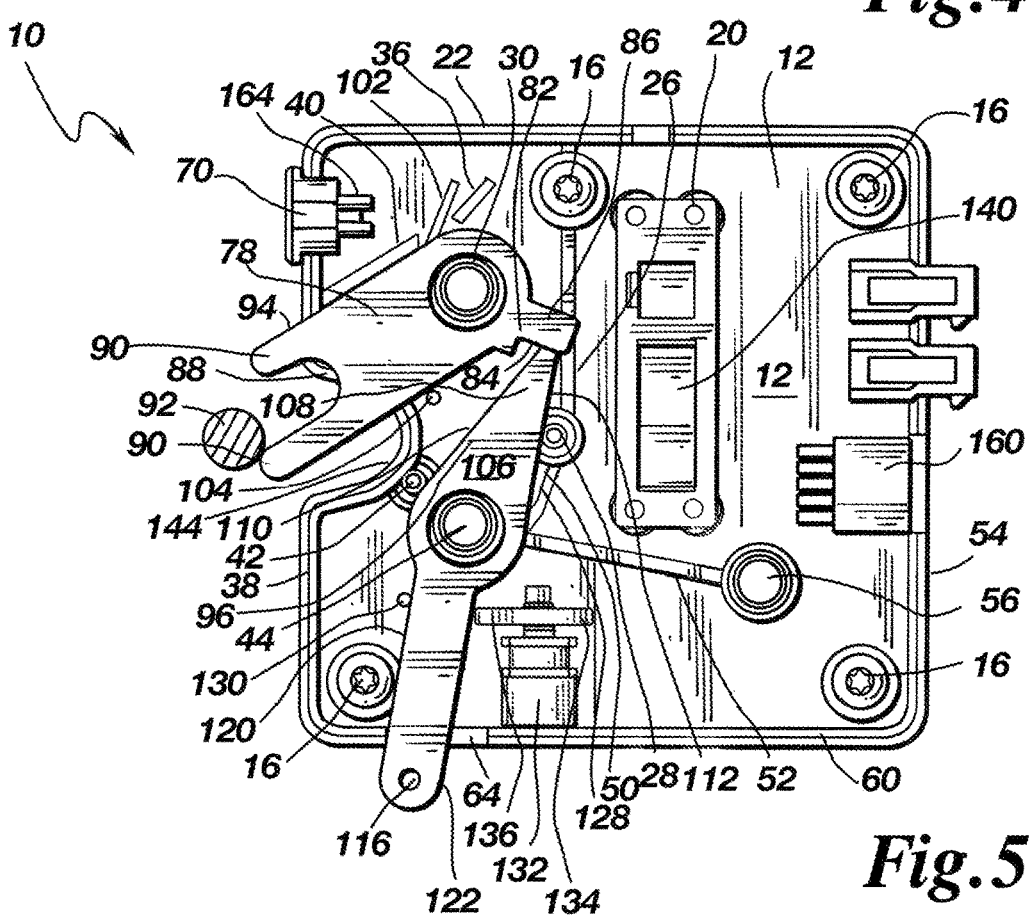
FIG. 5 is an alternative front side elevation view of the interior of the electronic trigger rotary pawl latch.

In at least one alternative embodiment as depicted in FIGS. 4 and 5 the eccentric cam 134 is positioned perpendicular with respect to the trigger pawl leg 118. In this embodiment, the axle of the gear motor 132 extends in a vertical direction from the bottom wall 60 towards the top wall 22. The distance between the upper portion 136 and lower portion of the eccentric cam 134 provides the linear displacement of the trigger pawl leg 118 within the trigger pawl cutout 64.

In this embodiment, when the axle of the gear motor 132 is rotated, the edge of the eccentric cam 134 pushes against the lower leg surface 122 causing the trigger pawl 106 to rotate in a clockwise direction. During this rotation, the trigger pawl tip 108 is disengaged from the latch pawl shoulder 82, allowing the latch pawl 78 to rotate to open, unlatch or unlock the rotary pawl latch 10.

Figure 6:
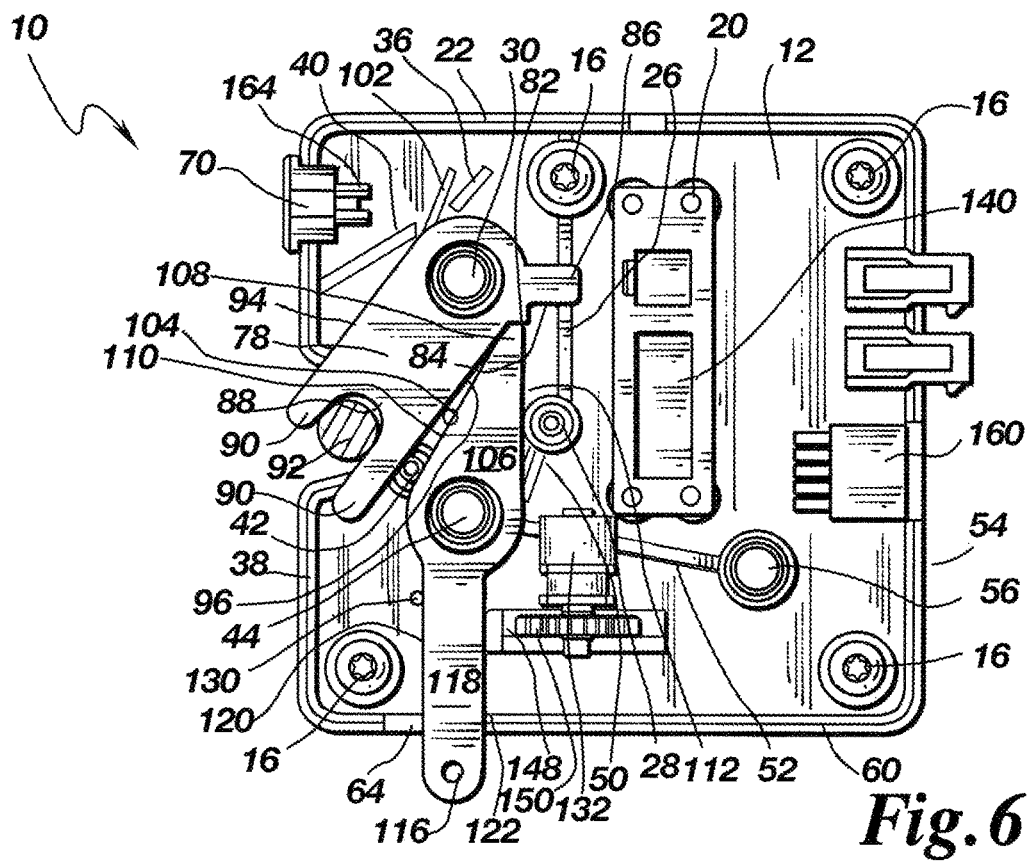
FIG. 6 is an alternative front side elevation view of the interior of the electronic trigger rotary pawl latch.
Figure 7:
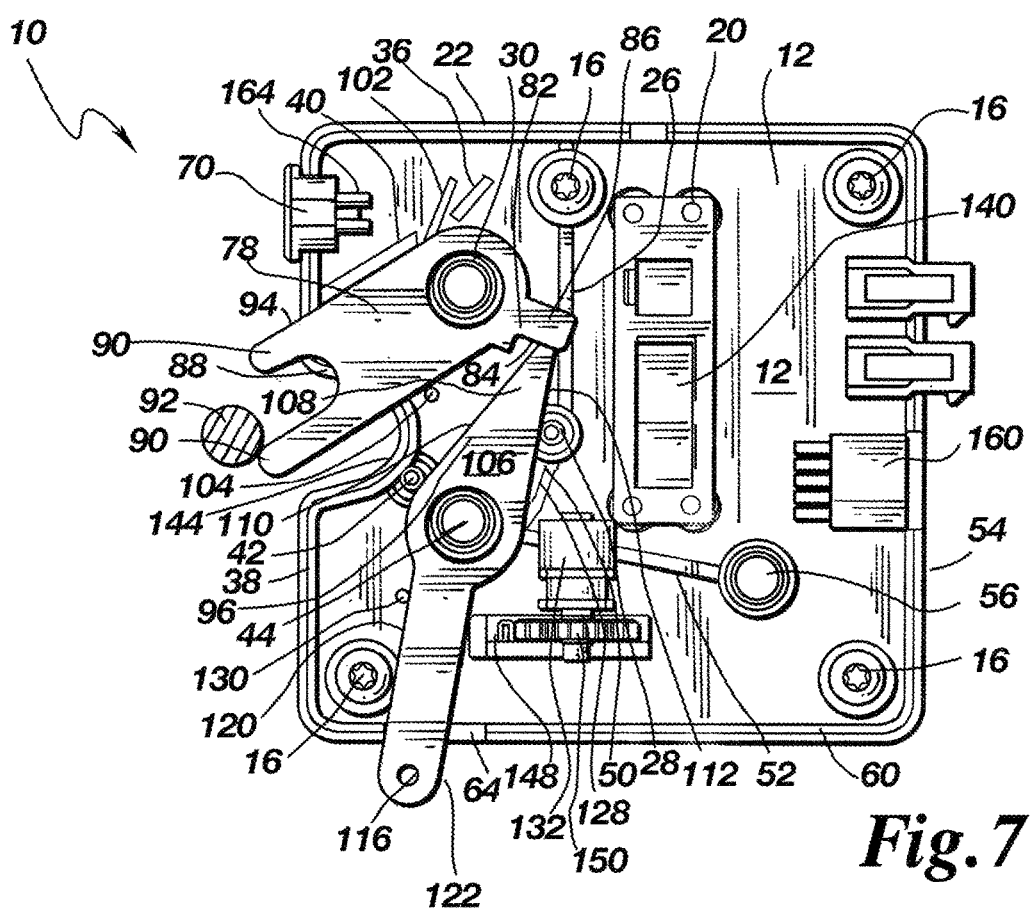
FIG. 7 is an alternative front side elevation view of the interior of the electronic trigger rotary pawl latch.

In at least one alternative embodiment as depicted in FIGS. 6 and 7 a rack 148 and pinion 150 gear system is used to move the trigger pawl leg 118 during the latching or unlatching of the rotary pawl latch 10. In this embodiment the pinion 150 is perpendicular with respect to the trigger pawl leg 118. The axle for the pinion 150 extends in a vertical direction from a location proximate to the bottom wall 60 towards the top wall 22. The distance between the left side and the right side of the rack 148 provides the linear displacement of the trigger pawl leg 118 within the trigger pawl cutout 64. In this embodiment, the axle engaged to the pinion 150 is rotated in a clockwise direction where the teeth of the pinion 150 engage the teeth of the rack 148 to impart linear movement of the rack 148 against the lower leg surface 122 to move the trigger pawl leg 118 forwardly towards the left wall 38 in the unlatched configuration within the trigger pawl cutout 64. Another actuation of the circuit engages the axle and pinion 150 to rotate the pinion 150 in a counterclockwise direction moving the rack 148 away from the lower leg surface 122 towards the right wall 54 permitting the trigger pawl spring 126 two rotate the trigger pawl leg 118 towards the right wall 54 for placement in the latched configuration.

As may be seen in FIGS. 2 through 7, a plug receiver 70 is disposed in the plug receiver cutouts 62 of the first housing 12 and second housing 14.

Figure 8:
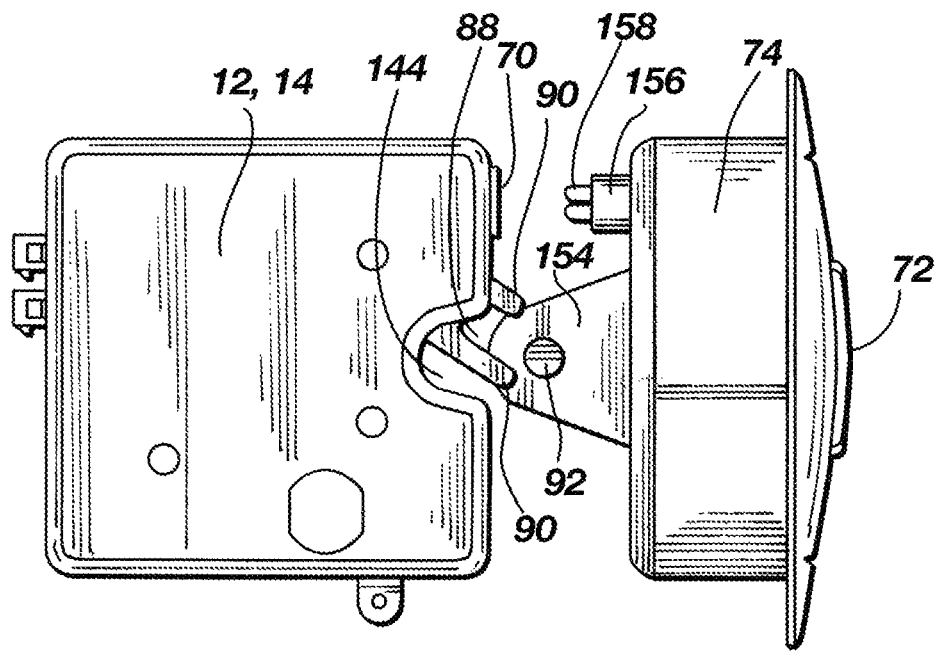
FIG. 8 is a perspective front side elevation view of the electronic trigger rotary pawl latch.
Figure 9:
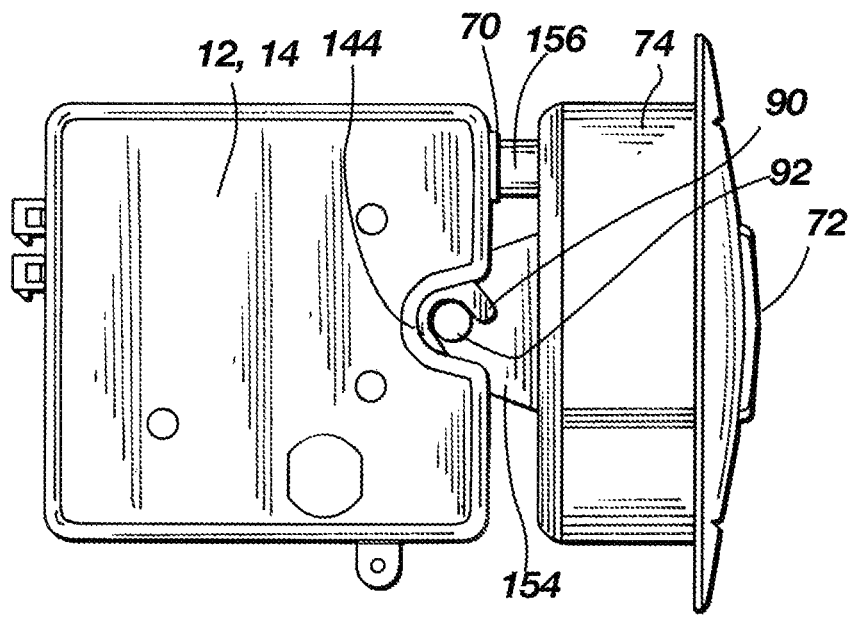
FIG. 9 is an alternative perspective front side elevation view of the electronic trigger rotary pawl latch.
Figure 10:
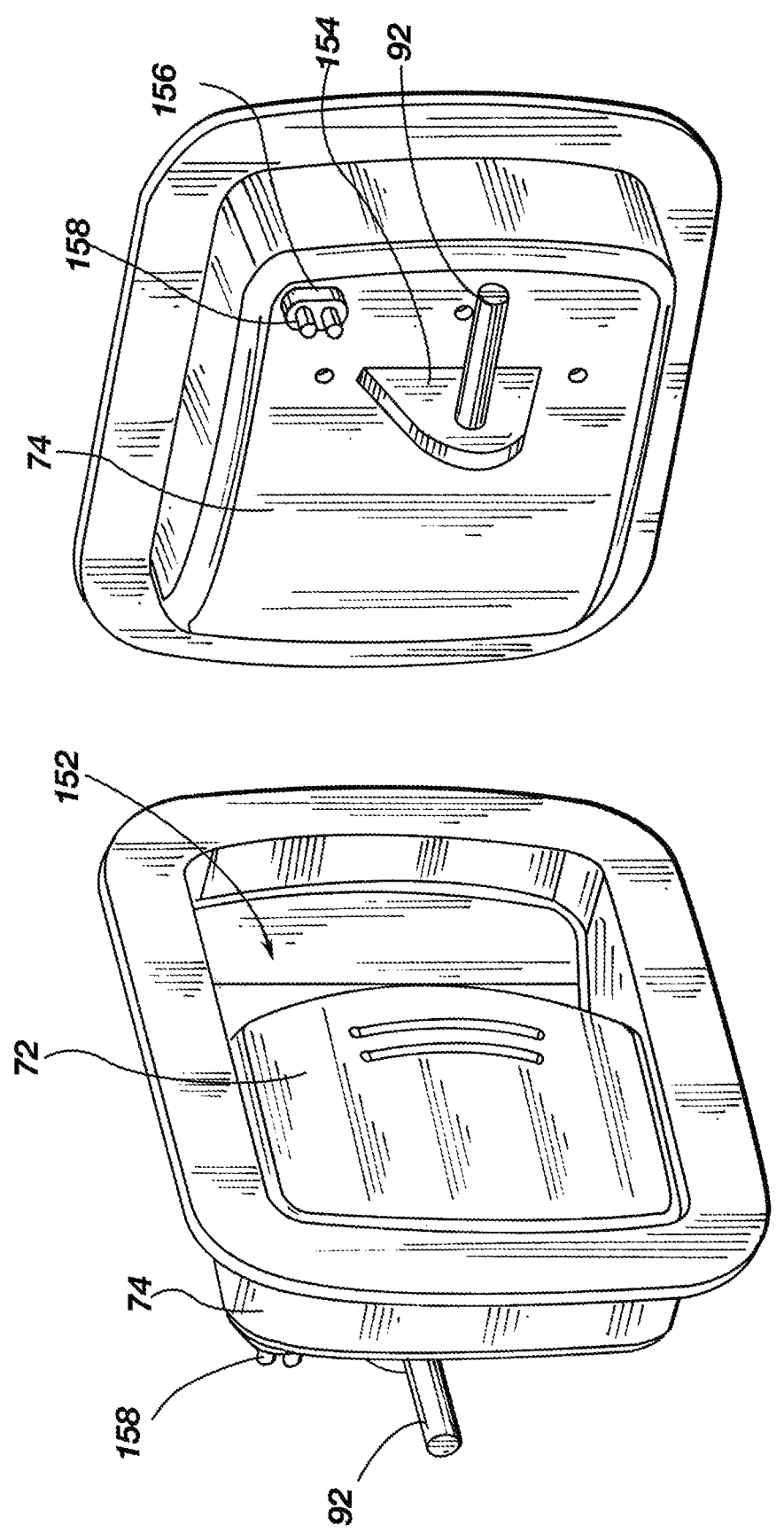
FIG. 10 is a composite isometric perspective front and rear view of the handle body of the electronic trigger rotary pawl latch.

Referring to FIGS. 8 through 10, the handle 72 is preferably engaged to a handle body 74, which defines a rearwardly extending cavern 152. The backside of the cavern 152 includes a striker bolt support 154 which includes a striker bolt 92. In at least one embodiment, an electrical plug 156 is engaged to the upper left corner of the cavern 152 extending outwardly from the rear surface. In one embodiment, the electrical plug 156 includes two contacts 158. However, in other embodiments, a single or multiple contacts may be used.

In a preferred embodiment, a microprocessor/controller 140 is engaged to the upper printed circuit board fastener receivers 20 and the lower printed circuit board fastener receivers 24 through the use of fasteners 18. The microprocessor/controller 140 is preferably an electrical communication with the electrical plug 156 through the electrical plug receiver 70, the gear motor 132 and electrical connector 160.

The electrical connector 160 is preferably located within the electrical adapter cutout 68 of the first housing 12 and second housing 14.

In the preferred embodiment, the microprocessor/controller 140 receives power from the electrical connector 162 for operation of the gear motor 132. In the preferred embodiment, the plug receiver 70 has two open electrical contacts. The plug receiver 70 is electrically engaged to the controller/microprocessor 140 and the electrical connector 160. When the handle 72, handle body 74 and striker bolt 92 are moved into a closed position, the striker bolt 92 engages the prongs 90 of the latch pawl 78, depressing the latch pawl spring 78 into the latched configuration. As the handle 72 and handle body 74 are closed/engaged with the housings 12 and 14, the contacts 158 of the electrical plug 156 are inserted into the plug receiver 70 making electrical contact with the open electrical contacts 164 in order to establish a closed electrical circuit with the gear motor 132. The closing of the electrical circuit upon the insertion of the contacts 158 within the plug receiver 70 causes the microprocessor/controller 140 to engaged to gear motor 132 to rotate or to move the actuator (eccentric cam 134 or pinion 150) in a counterclockwise direction to permit the trigger pawl spring 126 to decompress, and to move the trigger pawl leg 118 towards the right wall 54 within the trigger pawl cutout 64. The continued movement of the trigger pawl leg 118 towards the right wall 54 moves the trigger pawl tip 108 into engagement with the latch pawl shoulder 82 to finalize the latching of the striker bolt 92 within the rotary pawl latch 10.

In at least one embodiment, the microprocessor/controller 140 is also in electrical contact with a keypad or FOB. The entry of an appropriate code in the keypad or the proximity of the FOB to the rotary pawl latch 10 enables an individual to signal the microprocessor/controller 140 to engage the gear motor 132 for rotation in a clockwise direction to rotate the actuator (eccentric cam 134 or pinion 150) to move the trigger pawl leg 118 forwardly in the trigger pawl cutout 64 to release the trigger pawl tip 108 from the latch pawl shoulder 82, unlatching the rotary pawl latch 10, permitting the separation of the striker bolt 92 from the cavity 88. The handle 72 and handle body 74 may then be rotated away from the rotary pawl latch 78 to open and provide access into a compartment.

In at least one embodiment, the electrical connector 160 provides direct current electrical power to the rotary pawl latch 10. The direct current power is continuously applied the gear motor 132 and microprocessor/controller 140.

In at least one alternative embodiment, the rotary pawl latch 10 will include at least one indicator light, and preferably two indicator lights which will be in electrical communication with the microprocessor/controller 140 and the electrical connector 160. In this embodiment, microprocessor/controller 140 will regulate direct current power to the indicator lights to indicate the status of the rotary pawl latch 10. For example one or both lights may be illuminated to indicate a latched or unlatched status.

In another embodiment, the electrical connector 160 may be used to provide electricity to accessory electrical equipment regardless of the latched or unlatched status of the rotary pawl latch 10. In this embodiment, the electrical connector 160 may function as an electrical terminal block. Examples of accessory electrical equipment may include but is not necessarily limited to, supplemental lights, alarms, and various types of electrical power tools. In at least one embodiment, the electrical connector 160 may include several different types of output plugs for operation of accessory electrical equipment transported within or outside of a compartment of a vehicle.

Figure 11:
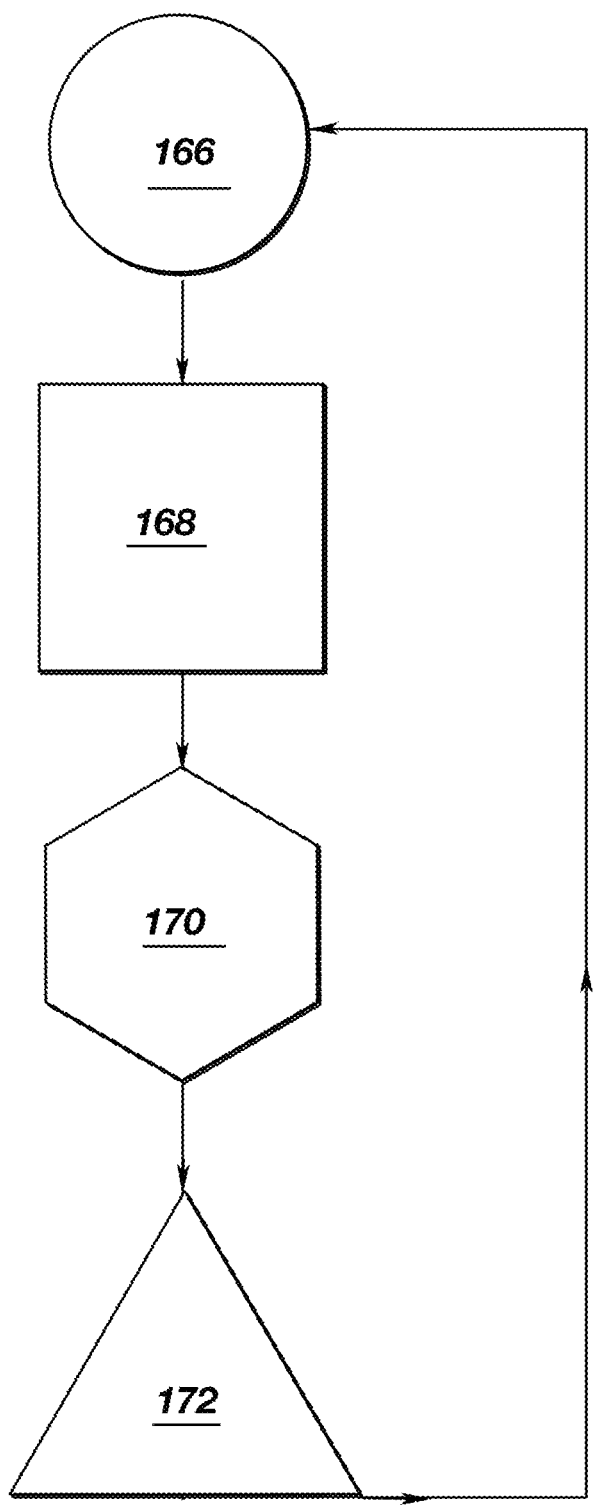
FIG. 11 is a block diagram summarizing the operation cycle of the electronic trigger rotary pawl latch.

In at least one embodiment, reference numeral 166 in FIG. 11 represents the positioning of the rotary pawl latch 10 in an unlatched configuration as represented in FIGS. 3, 5, 7 and 8. In the unlatched configuration the striker bolt 92 is separated from the cavity 88 and prongs 90 of the latch pawl 78.

In at least one embodiment, reference numeral 168 represents the positioning of the striker bolt 92 between the prongs 90 and closing pressure being applied to the handle body 74 relative to the housings 12, 14, which in turn causes the rotary pawl latch 10 to transition from the unlatched configuration to the latched configuration as represented by FIGS. 2, 4, 6, and 9. In this embodiment, the latch pawl spring 100 has been placed under tension, and the trigger pawl spring 126 has been released from a coiled or tensioned configuration. In addition, the trigger pawl tip 108 engages the latch pawl shoulder 82 to maintain the rotary pawl latch 10 in the latched configuration. In this embodiment, the actuator (eccentric cam 134 or pinion 150) is separated from the lower leg surface 122. Additionally, in this embodiment, the electrical contacts 158 are in electrical communication with the open electrical contacts 164, completing and closing a circuit between the controller 140, the gear motor 132 and the electrical connector 160.

In at least one embodiment, the keypad or FOB is represented by reference numeral 170. The keypad or FOB is manipulated by an individual by the entry of a passcode, or by proximity to a sensor integral to the housing 12, 14. In this embodiment, the activation of the keypad of FOB causes an electrical command signal to be communicated to the controller 140 to activate the gear motor 132.

In one embodiment, reference numeral 142 represents the signal being processed by the controller 140 and the electrical activation of the gear motor 132 to rotate the actuator (eccentric cam 134 or pinion 150) to engage the lower leg surface 122 and to move the lower leg surface 122 forwardly within the trigger pawl cutout 64 towards the left wall 38. The rotation of the actuator (eccentric cam 134 or pinion 150) towards the lower leg surface 122, moves the trigger pawl tip 108 away from the latch pawl shoulder 82 into the latch pawl ledge 84 and compresses the trigger pawl spring 126. Simultaneously, the latch pawl spring 100 is released and permitted to transfer the previously stored tension/compression onto the latch pawl 78, which in turn rotates the latch pawl 78 upwardly permitting separation of the striker bolt 92 from the cavity 88 and pair of prongs 90. The rotary pawl latch 10 is then transitioned from a latched configuration to an unlatched configuration permitting access into a compartment.

The configuration of the rotary pawl latch 10 has been returned to the configuration as indicated by reference numeral 166 enabling a repeat of the latching/unlatching cycle as identified herein.

In a first alternative embodiment an electronic trigger rotary pawl latch includes a housing having a left wall having a striker bolt receiving area, a bottom wall having a trigger pawl cutout, a right wall, a top wall, a front wall, a back wall and an interior, a first angled tab extends from the front wall into the interior, a second angled tab extends from the front wall into the interior, a rotary pawl pivot extends from the front wall into the interior, a trigger pawl pivot extends from the front wall into the interior, the trigger pawl pivot being below the rotary pawl pivot, and a third angled tab extends from the front wall into the interior, a plug receiver is secured to the left wall above the striker bolt receiving area, the plug receiver has at least one open electrical contact, a controller is disposed in the interior, the controller being in electrical communication with the plug receiver, a latch pawl spring is engaged to the rotary pawl pivot, the latch pawl spring is also engaged to the second angled tab or the first angled tab, a trigger pawl spring is engaged to the trigger pawl pivot, the trigger pawl spring is also engaged to the third angled tab, a latch pawl has a first pivot opening, the first pivot opening is placed around the rotary pawl pivot, the latch pawl further having a latch pawl tab extending horizontally outwardly from the latch pawl proximate to the first pivot opening, the latch pawl tab having a latch pawl ledge and a latch pawl shoulder, the latch pawl shoulder being located between a latch pawl lower surface and the latch pawl ledge, the latch pawl having a latch pawl upper surface, a cavity opposite to the first pivot opening, the cavity having a pair of prongs, the latch pawl lower surface engaging the latch pawl spring, a trigger pawl having a trigger pawl tip, a trigger pawl upper surface, a trigger pawl lower surface, a second pivot opening, the second pivot opening being placed around the trigger pawl pivot, the trigger pawl further having an upper leg surface and a lower leg surface and a trigger pawl leg below the second pivot opening, a portion of the trigger pawl leg extending through the trigger pawl cutout to the exterior of the housing, the upper leg surface engaging the trigger pawl spring, a gear motor disposed within the interior, the gear motor having an actuator, the actuator engaging the lower leg surface, the gear motor being in electrical communication with the controller, an electrical connector being secured to the housing, the electrical connector receiving power from a power source, and the electrical connector being in electrical communication with the controller, a handle body having a front side, the front side having a handle and a cavern, the handle body further having a rear side having a striker bolt and an electrical plug, the electrical plug having at least one contact, wherein the housing and the handle body have an unlatched configuration where the striker bolt is separated from the cavity and the at least one contact is separated from the at least one open electrical contact, wherein the latch pawl upper surface is proximate to the second angled tab and the latch pawl spring has a reduced latch pawl spring compression as compared to the latch pawl spring compression in a latched configuration, the trigger pawl tip is engaged to the latch pawl ledge, the trigger pawl spring is exposed to an increased trigger pawl spring compression in the unlatched configuration as compared to the trigger pawl spring compression in the latched configuration, the actuator is engaged to the lower leg surface and the trigger pawl leg has been moved in the trigger pawl cutout towards the left wall, and further wherein, in the latched configuration the striker bolt is positioned within the cavity between the prongs, the at least one contact is engaged to the at least one open electrical contact completing an electrical circuit, the latch pawl spring is exposed to increased latch pawl spring compression as compared to the latch pawl spring compression in the unlatched configuration, the trigger pawl tip is engaged to the latch pawl shoulder, the trigger pawl spring is exposed to decreased trigger pawl spring compression as compared to the trigger pawl spring compression in the unlatched configuration, the actuator is disengaged from the lower leg surface and the trigger pawl leg has moved in the trigger pawl cutout towards the right wall.

In a second alternative embodiment according to the first embodiment, the left wall has a plug receiver cutout and the right wall has an electrical adapter cutout.

In a third alternative embodiment according to the second embodiment, the second angled tab is located between the left wall and the first angled tab, and the rotary pawl pivot is positioned below the first angled tab.

In a fourth alternative embodiment according to the third embodiment, the housing has a first pin receiver extending from the front wall into the interior, the first pin receiver being positioned centrally relative to the front wall.

In a fifth alternative embodiment according to the fourth embodiment, the trigger pawl pivot is located proximate to the first pin receiver and below the rotary pawl pivot.

In a sixth alternative embodiment according to the fifth embodiment, the housing further includes a second pin receiver extending from the front wall into the interior, the second pin receiver being positioned proximate to the trigger pawl pivot.

In a seventh alternative embodiment according to the sixth embodiment, the third angled tab is located below the first pin receiver.

In an eighth alternative embodiment according to the seventh embodiment, the plug receiver is positioned in the plug receiver cutout, and the plug receiver has at least two electrical contacts.

In a ninth alternative embodiment according to the eighth embodiment, the electrical plug has at least two contacts.

In a tenth alternative embodiment according to the ninth embodiment, the housing has a first pin, the first pin is disposed in the first pin receiver, the housing further includes a second pin, the second pin being disposed in the second pin receiver.

In an eleventh alternative embodiment according to the tenth embodiment, the gear motor is positioned proximate to the bottom wall.

In a twelfth alternative embodiment according to the eleventh embodiment, the electrical connector is positioned in the electrical adapter cutout.

In a thirteenth alternative embodiment according to the twelfth embodiment, a keypad is in electrical communication with the controller, the keypad signaling the controller to engage the gear motor to release the electronic trigger rotary pawl latch from the latched configuration to the unlatched configuration.

In a fourteenth alternative embodiment according to the thirteenth embodiment, the actuator comprises an eccentric cam having an axis of rotation, the trigger pawl leg defining a plane, wherein the rotation of the actuator is aligned with the plane.

In a fifteenth alternative embodiment according to the fourteenth embodiment, the actuator comprises an eccentric cam, the trigger pawl leg defining a plane, and the rotation of the eccentric cam is perpendicular to the plane.

In a sixteenth alternative embodiment according to the fifteenth embodiment, the actuator comprises a rack and pinion, the rack engaging the lower leg surface to release the electronic trigger rotary pawl latch from the latched configuration to the unlatched configuration.

In a seventeenth alternative embodiment according to the sixteenth embodiment, the manipulation of the handle body towards the housing moves the striker bolt into the cavity, and continued movement of the handle body towards the housing moves the latch pawl lower surface towards the second pin, and compresses the latch pawl spring into the latched configuration.

In an eighteenth alternative embodiment, an electronic trigger rotary pawl latch comprises a housing having a plug receiver cutout, a left wall having a striker bolt receiving area, a bottom wall having a trigger pawl cutout, a right wall having an electrical adapter cutout, a top wall, a front wall, a back wall, and an interior, the housing further having a first angled tab extending from the front wall into the interior, a second angled tab extending from the front wall into the interior, the second angled tab being located between the left wall and the first angled tab, a rotary pawl pivot extending from the front wall into the interior, the rotary pawl pivot being positioned below the first angled tab, a first pin extending from the front wall into the interior, the first pin being positioned centrally relative to the front wall, a trigger pawl pivot extending from the front wall into the interior, the trigger pawl pivot being located proximate to the first pin below the rotary pawl pivot, a second pin extending from the front wall into the interior, the second pin being positioned proximate to the trigger pawl pivot, and a third angled tab extending from the front wall into the interior, the third angled tab being located below the first pin, a plug receiver positioned in the plug receiver cutout, the plug receiver having at least two open electrical contacts, a controller positioned in the interior, the controller being in electrical communication with the plug receiver, a latch pawl spring, the latch pawl spring being engaged to the rotary pawl pivot, the latch pawl spring also being engaged to the second angled tab or the first angled tab, a trigger pawl spring, the trigger pawl spring being engaged to the trigger pawl pivot, the trigger pawl spring also being engaged to the third angled tab, a latch pawl, the latch pawl having a first pivot opening, the first pivot opening being disposed around the rotary pawl pivot, the latch pawl further having a latch pawl tab extending horizontally outwardly from the latch pawl proximate to the first pivot opening, the latch pawl tab having a latch pawl ledge and a latch pawl shoulder, the latch pawl shoulder being disposed between a latch pawl lower surface and the latch pawl ledge, the latch pawl having a latch pawl upper surface, a cavity opposite to the first pivot opening, the cavity having a pair of prongs, the latch pawl lower surface engaging the latch pawl spring, a trigger pawl, the trigger pawl having a trigger pawl tip, a trigger pawl upper surface, a trigger pawl lower surface, a second pivot opening, the second pivot opening being disposed around the trigger pawl pivot, the trigger pawl further having an upper leg surface and a lower leg surface and a trigger pawl leg below the second pivot opening, a portion of the trigger pawl leg extending through the trigger pawl cutout to the exterior of the housing, the upper leg surface engaging the trigger pawl spring, a gear motor, the gear motor being disposed within the interior proximate to the bottom wall, the gear motor having an actuator, the actuator engaging the lower leg surface, the gear motor being in electrical communication with the controller and an electrical connector, the electrical connector being disposed in the electrical adapter cutout, the electrical connector receiving power from a power source, and the electrical connector being in electrical communication with the controller, a handle body, the handle body having a front side having a handle and a cavern, the handle body further having a rear side having a striker bolt and an electrical plug, the electrical plug having at least two contacts, wherein the housing and the handle body have an unlatched configuration where the striker bolt is separated from the cavity and the at least two contacts are separated from the at least two open electrical contacts, the latch pawl upper surface is proximate to the second angled tab and the latch pawl spring has a reduced latch pawl spring compression as compared to the latch pawl spring compression in a latched configuration, the trigger pawl tip is engaged to the latch pawl ledge, the trigger pawl spring is exposed to an increased trigger pawl spring compression in the unlatched configuration as compared to the trigger pawl spring compression in the latched configuration, the actuator is engaged to the lower leg surface and the trigger pawl leg has been moved in the trigger pawl cutout towards the left wall, and further wherein, in the latched configuration the striker bolt is positioned within the cavity between the prongs, the at least two contacts are engaged to the at least two open electrical contacts completing an electrical circuit, the latch pawl spring is exposed to increased latch pawl spring compression as compared to the latch pawl spring compression in the unlatched configuration, the trigger pawl tip is engaged to the latch pawl shoulder, the trigger pawl spring is exposed to a decreased trigger pawl spring compression as compared to the trigger pawl spring compression in the unlatched configuration, the actuator is disengaged from the lower leg surface and the trigger pawl leg has moved in the trigger pawl cutout towards the right wall.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

We claim:

1. An electronic trigger rotary pawl latch comprising:
   a housing, said housing having a left wall having a striker bolt receiving area, a bottom wall having a trigger pawl cutout, a right wall, a top wall, a front wall, a back wall and an interior, a first angled tab extending from said front wall into said interior, a second angled tab extending from said front wall into said interior, a rotary pawl pivot extending from said front wall into said interior, a trigger pawl pivot extending from said front wall into said interior, said trigger pawl pivot being below said rotary pawl pivot, and a third angled tab extending from said front wall into said interior;
   a plug receiver secured to said left wall above said striker bolt receiving area, said plug receiver having at least one open electrical contact;
   a controller disposed in said interior, said controller being in electrical communication with said plug receiver;
   a latch pawl spring, said latch pawl spring being engaged to said rotary pawl pivot, said latch pawl spring also being engaged to said second angled tab or said first angled tab;
   a trigger pawl spring, said trigger pawl spring being engaged to said trigger pawl pivot, said trigger pawl spring also being engaged to said third angled tab;

a latch pawl, said latch pawl having a first pivot opening, said first pivot opening being disposed around said rotary pawl pivot, said latch pawl further having a latch pawl tab extending horizontally outwardly from said latch pawl proximate to said first pivot opening, said latch pawl tab having a latch pawl ledge and a latch pawl shoulder, said latch pawl shoulder being disposed between a latch pawl lower surface and said latch pawl ledge, said latch pawl having a latch pawl upper surface, a cavity opposite to said first pivot opening, said cavity having a pair of prongs, said latch pawl lower surface engaging said latch pawl spring;

a trigger pawl, said trigger pawl having a trigger pawl tip, a trigger pawl upper surface, a trigger pawl lower surface, a second pivot opening, said second pivot opening being disposed around said trigger pawl pivot, said trigger pawl further having an upper leg surface and a lower leg surface and a trigger pawl leg below said second pivot opening, a portion of said trigger pawl leg extending through said trigger pawl cutout to an exterior of said housing, said upper leg surface engaging said trigger pawl spring;

a gear motor disposed within said interior, said gear motor having an actuator, said actuator engaging said lower leg surface, said gear motor being in electrical communication with said controller;

an electrical connector being secured to said housing, said electrical connector receiving power from a power source, and said electrical connector being in electrical communication with said controller;

a handle body having a front side, said front side having a handle and a cavern, said handle body further having a rear side having a striker bolt and an electrical plug, said electrical plug having at least one contact;

wherein said housing and said handle body have an unlatched configuration where said striker bolt is separated from said cavity and said at least one contact is separated from said at least one open electrical contact, said latch pawl upper surface is proximate to said second angled tab and said latch pawl spring has a reduced latch pawl spring compression as compared to said latch pawl spring compression in a latched configuration, said trigger pawl tip is engaged to said latch pawl ledge, said trigger pawl spring is exposed to an increased trigger pawl spring compression in said unlatched configuration as compared to said trigger pawl spring compression in said latched configuration, said actuator is engaged to said lower leg surface and said trigger pawl leg has been moved in said trigger pawl cutout towards said left wall; and further wherein, in said latched configuration said striker bolt is positioned within said cavity between said prongs, said at least one contact is engaged to said at least one open electrical contact completing an electrical circuit, said latch pawl spring is exposed to increased latch pawl spring compression as compared to said latch pawl spring compression in said unlatched configuration, said trigger pawl tip is engaged to said latch pawl shoulder, said trigger pawl spring is exposed to decreased trigger pawl spring compression as compared to said trigger pawl spring compression in said unlatched configuration, said actuator is disengaged from said lower leg surface and said trigger pawl leg has moved in said trigger pawl cutout towards said right wall.

2. The electronic trigger rotary pawl latch according to claim 1, said left wall having a plug receiver cutout and said right wall having an electrical adapter cutout.

3. The electronic trigger rotary pawl latch according to claim 2, said second angled tab being located between said left wall and said first angled tab, and said rotary pawl pivot is positioned below said first angled tab.

4. The electronic trigger rotary pawl latch according to claim 3, said housing further having a first pin receiver extending from said front wall into said interior, said first pin receiver being positioned centrally relative to said front wall.

5. The electronic trigger rotary pawl latch according to claim 4, wherein said trigger pawl pivot is located proximate to said first pin receiver and below said rotary pawl pivot.

6. The electronic trigger rotary pawl latch according to claim 5, said housing further having a second pin receiver extending from said front wall into said interior, said second pin receiver being positioned proximate to said trigger pawl pivot.

7. The electronic trigger rotary pawl latch according to claim 6, wherein said third angled tab is located below said first pin receiver.

8. The electronic trigger rotary pawl latch according to claim 7, wherein said plug receiver is positioned in said plug receiver cutout, and said plug receiver has at least two electrical contacts.

9. The electronic trigger rotary pawl latch according to claim 8, wherein said electrical plug has at least two contacts.

10. The electronic trigger rotary pawl latch according to claim 9, wherein said housing has a first pin, said first pin being disposed in said first pin receiver, said housing further having a second pin, said second pen being disposed in said second pin receiver.

11. The electronic trigger rotary pawl latch according to claim 10, wherein said gear motor is positioned proximate to said bottom wall.

12. The electronic trigger rotary pawl latch according to claim 11, wherein said electrical connector is positioned in said electrical adapter cutout.

13. The electronic trigger rotary pawl latch according to claim 12, further comprising a keypad in electrical communication with said controller, said keypad signaling said controller to engage said gear motor to release said electronic trigger rotary pawl latch from said latched configuration to said unlatched configuration.

14. The electronic trigger rotary pawl latch according to claim 13, wherein said actuator comprises an eccentric cam, said trigger pawl leg defining a plane, wherein rotation of said eccentric cam is aligned with said plane.

15. The electronic trigger rotary pawl latch according to claim 13, wherein said actuator comprises an eccentric cam, said trigger pawl leg defining a plane, and rotation of said eccentric cam is perpendicular to said plane.

16. The electronic trigger rotary pawl latch according to claim 13, wherein said actuator comprises a rack and pinion, said rack engaging said lower leg surface to release said electronic trigger rotary pawl latch from said latched configuration to said unlatched configuration.

17. The electronic trigger rotary pawl latch according to claim 13, wherein manipulation of said handle body towards said housing disposes said striker bolt in said cavity, and continued movement of said handle body towards said housing moves said latch pawl lower surface towards said second pin, and compresses said latch pawl spring into said latched configuration.

18. An electronic trigger rotary pawl latch comprising:
a housing, said housing having a plug receiver cutout, a left wall having a striker bolt receiving area, a bottom wall having a trigger pawl cutout, a right wall having an electrical adapter cutout, a top wall, a front wall, a back wall, and an interior, said housing further having a first angled tab extending from said front wall into said interior, a second angled tab extending from said front wall into said interior, said second angled tab being located between said left wall and said first angled tab, a rotary pawl pivot extending from said front wall into said interior, said rotary pawl pivot being positioned below said first angled tab, a first pin extending from said front wall into said interior, said first pin being positioned centrally relative to said front wall, a trigger pawl pivot extending from said front wall into said interior, said trigger pawl pivot being located proximate to said first pin below said rotary pawl pivot, a second pin extending from said front wall into said interior, said second pin being positioned proximate to said trigger pawl pivot, and a third angled tab extending from said front wall into said interior, said third angled tab being located below said first pin;
a plug receiver positioned in said plug receiver cutout, said plug receiver having at least two open electrical contacts;
a controller positioned in said interior, said controller being in electrical communication with said plug receiver;
a latch pawl spring, said latch pawl spring be engaged to said rotary pawl pivot, said latch pawl spring also being engaged to said second angled tab or said first angled tab;
a trigger pawl spring, said trigger pawl spring being engaged to said trigger pawl pivot, said trigger pawl spring also being engaged to said third angled tab;
a latch pawl, said latch pawl having a first pivot opening, said first pivot opening being disposed around said rotary pawl pivot, said latch pawl further having a latch pawl tab extending horizontally outwardly from said latch pawl proximate to said first pivot opening, said latch pawl tab having a latch pawl ledge and a latch pawl shoulder, said latch pawl shoulder being disposed between a latch pawl lower surface and said latch pawl ledge, said latch pawl having a latch pawl upper surface, a cavity opposite to said first pivot opening, said cavity having a pair of prongs, said latch pawl lower surface engaging said latch pawl spring;
a trigger pawl, said trigger pawl having a trigger pawl tip, a trigger pawl upper surface, a trigger pawl lower surface, a second pivot opening, said second pivot opening being disposed around said trigger pawl pivot, said trigger pawl further having an upper leg surface and a lower leg surface and a trigger pawl leg below said second pivot opening, a portion of said trigger pawl leg extending through said trigger pawl cutout to an exterior of said housing, said upper leg surface engaging said trigger pawl spring;
a gear motor, said gear motor being disposed within said interior proximate to said bottom wall, said gear motor having an actuator, said actuator engaging said lower leg surface, said gear motor being in electrical communication with said controller;
an electrical connector, said electrical connector being disposed in said electrical adapter cutout, said electrical connector receiving power from a power source, and said electrical connector being in electrical communication with said controller;
a handle body, said handle body having a front side having a handle and a cavern, said handle body further having a rear side having a striker bolt and an electrical plug, said electrical plug having at least two contacts;
wherein said housing and said handle body have an unlatched configuration where said striker bolt is separated from said cavity and said at least two contacts are separated from said at least two open electrical contacts, said latch pawl upper surface is proximate to said second angled tab and said latch pawl spring has a reduced latch pawl spring compression as compared to said latch pawl spring compression in a latched configuration, said trigger pawl tip is engaged to said latch pawl ledge, said trigger pawl spring is exposed to an increased trigger pawl spring compression in said unlatched configuration as compared to said trigger pawl spring compression in said latched configuration, said actuator is engaged to said lower leg surface and said trigger pawl leg has been moved in said trigger pawl cutout towards said left wall; and
further wherein, in said latched configuration said striker bolt is positioned within said cavity between said prongs, said at least two contacts are engaged to said at least two open electrical contacts completing an electrical circuit, said latch pawl spring is exposed to increased latch pawl spring compression as compared to said latch pawl spring compression in said unlatched configuration, said trigger pawl tip is engaged to said latch pawl shoulder, said trigger pawl spring is exposed to decreased trigger pawl spring compression as compared to said trigger pawl spring compression in said unlatched configuration, said actuator is disengaged from said lower leg surface and said trigger pawl leg has moved in said trigger pawl cutout towards said right wall.

* * * * *